Patented Nov. 4, 1930

1,780,842

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

PRODUCTION OF SULPHITE PULP

No Drawing.     Application filed January 5, 1927.  Serial No. 159,243.

This invention relates to the production of sulphite pulp suitable for use in the manufacture of high grade papers, and also for the preparation of a fiber high in alpha or resistant cellulose and low in ash content, as described in U. S. application for patent, Serial No. 72,522, filed December 1, 1925, by Milton O. Schur and myself.

It has been found that a fiber-liberating liquor consisting of a sulphurous acid solution of a highly soluble sulphite, such as sodium or ammonium sulphite, is particularly adapted for the production of such sulphite pulp.

The present invention has among its objects the production of sulphite fiber equivalent to fiber liberated by digestion of cellulose-fiber-bearing material in a sulphurous acid solution of a soluble sulphite, and the realization of certain economies and advantages over such digestion. These objects may be attained by employing a sulphurous acid solution of ammonium sulphate as a fiber-liberating liquor.

Ammonium sulphate itself does not, so far as I am aware, effect a fiber-liberating action, but it is probable that the metathetical reaction which takes place between the sulphurous acid and the ammonium sulphate yields a small proportion of ammonium bisulphite, which reacts with and dissolves the encrusting or cementitious content of the cellulose-fiber-bearing material to effect an isolation of the fibers. This metathetical reaction may perhaps best be expressed as follows:

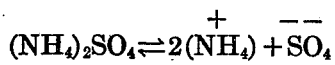
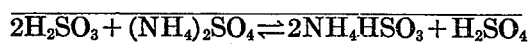

As the bisulphite constituent progressively dissolves the encrusting content and becomes "spent" or withdrawn from the sphere of reaction, the ammonium sulphate progressively reacts with sulphurous acid to produce other ammonium bisulphite, so that a progressive fiber-liberating action takes place. This action of such a liquor upon cellulosic material is similar to the action of a sulphurous acid solution of sodium sulphate, as described in Patent No. 1,427,125, issued to me August 29, 1922.

By using ammonium sulphate as the raw material in place of ammonium sulphite or sodium sulphate, certain noteworthy advantages may be realized. Thus, ammonium sulphate constitutes a much cheaper source of ammonium constituent and is readily obtainable on the market, being a by-product of the destructive distillation of coal at gas works. Ammonium sulphite, on the other hand, is not readily obtainable on the market and must be prepared at the pulp mill from compressed or liquid ammonia and sulphur dioxide, such preparation involving the elements of danger and nuisance. Furthermore, a unit of ammonia as such is more expensive than a unit of ammonia in the form of ammonium sulphate.

Another advantage realized by digestion in a sulphurous acid solution of ammonium sulphate resides in the fact that ammonium sulphate is more stable than ammonium sulphite, which latter decomposes more or less at digesting temperatures into ammonia and sulphur dioxide. Consequently, a lower loss of ammonia constituent is likely to be experienced when digestion is carried out in the more stable salt, as the blowpit gases and vapors, the relief gases and vapors, or gases and vapors leaking from the digester contain a much lower proportion of ammonia.

The process of digestion of the present invention may be practised economically without necessitating the installation of the smelting and associated recovery apparatus which is necessary when digestion is carried out in solutions of sodium salts, e. g., sodium sulphite or sodium sulphate, in order to recover the valuable sodium constituent and to make the process sufficiently economical to compete in some measure with the process of digestion in the usual calcium bisulphite liquor. Thus, I have found that the spent liquor resulting from digestion in a sulphurous acid solution of ammonium sulphate possesses unique characteristics. For example, such liquor, or its conversion products, have been found to be more effective as a dispersing agent or has more dispersing power than the usual calcium bisulphite spent liquor, and is admirably adapted as a stabilizer for colloids or colloidal dispersions—i. e., emulsions or suspensions, such as inks—or as a dispersing vehicle for the preparation of dispersions of various materials. When used for the preparation of writing inks of the usual viscosity or fluidity, the spent liquor is concentrated without neutralization to about 20° to 30° Baumé, whereupon a suitable iron compound, such as ferrous sulphate, together with pyrogallates or gallic acid, are added thereto in prescribed quantity. If there is insufficient outlet or demand for such spent liquor as a stabilizing or dispersing agent, it may be readily converted into other valuable products, and more particularly fertilizer, inasmuch as the spent liquor contains a fixed nitrogen or ammonia content approximately equivalent to the ammonia content present in the fresh digesting liquor. One portion of the fixed nitrogen or ammonia content occurs as ammonium sulphate which remained unspent during digestion, and another portion exists in combined state with organic matter, as in the form of ammonium ligneous sulphonate. When such spent liquor is to be converted into a fertilizer, it is preferably neutralized, then evaporated, with or without previous neutralization, to the desired concentration, and finally dried to a flaky or pulverulent condition. The product is an excellent fertilizer, since it not only contains approximately the fixed nitrogen content of the fresh liquor, but also the potassium, nitrogen and organic matter removed from the wood. If the acid spent liquor is neutralized prior to evaporation, the fertilizing value of the product may be enhanced by the use of basic calcium phosphate, potassium carbonate, or other basic potassium as the neutralizing agent.

The process of digestion for the production of sulphite pulp in accordance with this invention may be carried out substantially as follows. The usual sulphite digester is charged with wood chips and a liquor having an ammonium sulphate concentration of from 1% to 8% and a free $SO_2$ content of from 3% to 8%. If the spent liquor is to be employed as a dispersing medium, a liquor of low ammonium sulphate concentration is preferably employed for digestion, as an electrolyte tends to reduce the dispersing power of the resulting spent liquor. If, on the other hand, the spent liquor is to be converted into fertilizer, liquors of high ammonium sulphate concentration may be employed for digestion. The charge is digested for about eight to twelve hours, at a temperature ranging from 235° F. to 285° F., and a pressure of from 50 to 85 pounds, the particular time, temperature and pressure conditions maintained depending upon the concentration of ammonium sulphate in the liquor. Tests may be made from time to time in accordance with the usual practice, to ascertain the extent of fiber liberation which has taken place.

After digestion has been completed, the digester charge is blown into a blowpit and the $SO_2$—containing gases liberated from the heated mass may be recovered in accordance with approved methods. The pulp is then separated and washed from the spent liquor, whereupon it may be subjected to further processing, as desired.

Such pulp is comparable to the pulp produced when wood chips are digested in a sulphurous acid solution of sodium sulphite, ammonium sulphite or sodium sulphate, and is suitable for the manufacture of high grade papers, and also in the preparation of fiber of high alpha cellulose and low ash content.

The separated spent acid liquor, if it is to be converted to fertilizer, is preferably neutralized prior to evaporation, preferably with basic calcium phosphate, which may be the natural-occurring phosphate rock and which is readily available on the market and is relatively inexpensive. The rock is preferably used in pulverulent form, so as to effect a rapid neutralizing action. The neutralized liquor is then evaporated to about a 50% concentration, and then finally dried, as by using a so-called drum dryer or hot air spray dryer or other suitable apparatus which serves to produce a flaky or pulverulent product. The product contains the fertilizer essentials, viz., fixed nitrogen, phosphorus, and potassium, in a form available for plant nutrition. It also contains the organic encrusting material removed from the wood chips by the digesting liquor. Such organic material enhances the fertilizing value of the product, as it decomposes in the soil into humus, carbon dioxide, and other products which stimulate plant growth and maintain the soil in a loose, porous condition. In certain instances, it may be desirable to add suitable potassium-bearing material, together with the calcium basic phosphate, to the acid spent liquor, to increase the potassium content of the product. Suitable potassium salts, in which the potassium exists in a form available as plant food, or basic potash compounds, such as potassium carbonate, which react to form such salts, may be utilized.

In place of recovering the fixed nitrogen of the spent liquor in the form of fertilizer, it may be desirable to recover a portion or all of such nitrogen in the form of ammonia. This may be accomplished by neutralizing the hot acid spent liquor and then delivering the neutral liquor to a still, whereupon sufficient alkaline compound, such as lime or caustic soda, is added to the liquor to liberate its nitrogen content in the form of ammonia. When pulverulent lime is employed for such purpose, in addition to functioning as caustic soda to produce ammonium hydroxide, which latter decomposes into ammonia at the elevated temperature of the liquor, it reacts with the $SO_2$ ions to precipitate calcium sulphate. The ammonia is thus distilled over, and may be recovered as in an aqueous solution of sulphurous acid and/or sulphuric acid, for use as a fresh acid cooking liquor. Where the fixed nitrogen is liberated from the spent liquor as ammonia which is recovered in acid solution to produce a fresh acid cooking liquor, it is preferable to make up losses of fixed nitrogen in the cycle by the addition of fixed nitrogen in the form of ammonium sulphate. In such case, the cooking liquor consists of a sulphurous acid solution of ammonium sulphite and ammonium sulphate. Various other chemicals (e. g., alkali earth metal salts) may be included in the cooking liquor, in accordance with the present invention. For example, a certain amount of potassium-containing material, such as potassium sulphate or basic potassium compounds, may be added, particularly when the spent liquor is to be treated to produce a fertilizer. Also, a certain proportion of other alkali earth metal salts, such as sodium sulphate and/or sodium sulphite, may be included.

I do not herein claim the process of converting the spent liquor into a fertilizer product, or the product thus obtained, as this is described and claimed in my application for patent, Serial No. 159,501, filed January 6, 1927.

I claim:

1. A process which comprises digesting raw cellulosic material at elevated temperature and pressure conditions in a solution comprising sulphurous acid and ammonium sulphate.

2. A process which comprises digesting raw cellulosic material at elevated temperature and pressure conditions in a solution comprising sulphurous acid, ammonium sulphate and ammonium sulphite.

3. A process which comprises digesting raw cellulosic material at elevated temperature and pressure conditions in a solution comprising sulphurous acid, ammonium sulphate and alkali earth metal salts.

4. A process which comprises digesting raw cellulosic material at elevated temperature and pressure conditions in a solution comprising sulphurous acid, ammonium sulphate and sodium salts.

5. A process which comprises digesting raw cellulosic material at elevated temperature and pressure conditions in a solution comprising sulphurous acid, ammonium sulphate, ammonium sulphite and sodium salts.

6. A process which comprises digesting raw cellulosic material under fiber-liberating conditions in a sulphurous acid solution containing ammonium sulphate, separating the pulp from the spent liquor of digestion, and concentrating the spent liquor.

7. A process which comprises digesting raw cellulosic material under fiber-liberating conditions in a sulphurous acid solution containing ammonium sulphate, separating the pulp from the spent liquor of digestion, and concentrating the spent liquor to about 20° to 30° Baumé.

8. A process which comprises digesting raw cellulosic material under fiber-liberating conditions in a cooking liquor containing ammonium sulphate.

9. A cooking liquor for the production of pulp, comprising a sulphurous acid solution containing ammonium sulphate.

10. A cooking liquor for the production of pulp, comprising a sulphurous acid solution containing ammonium sulphate and ammonium sulphite.

11. A cooking liquor for the production of pulp, comprising a sulphurous acid solution of ammonium sulphate and alkali earth metal salts.

12. A cooking liquor for the production of pulp, comprising a sulphurous acid solution containing ammonium sulphate and sodium salts.

In testimony whereof I have affixed my signature.

GEORGE. A. RICHTER.